United States Patent Office 3,396,180
Patented Aug. 6, 1968

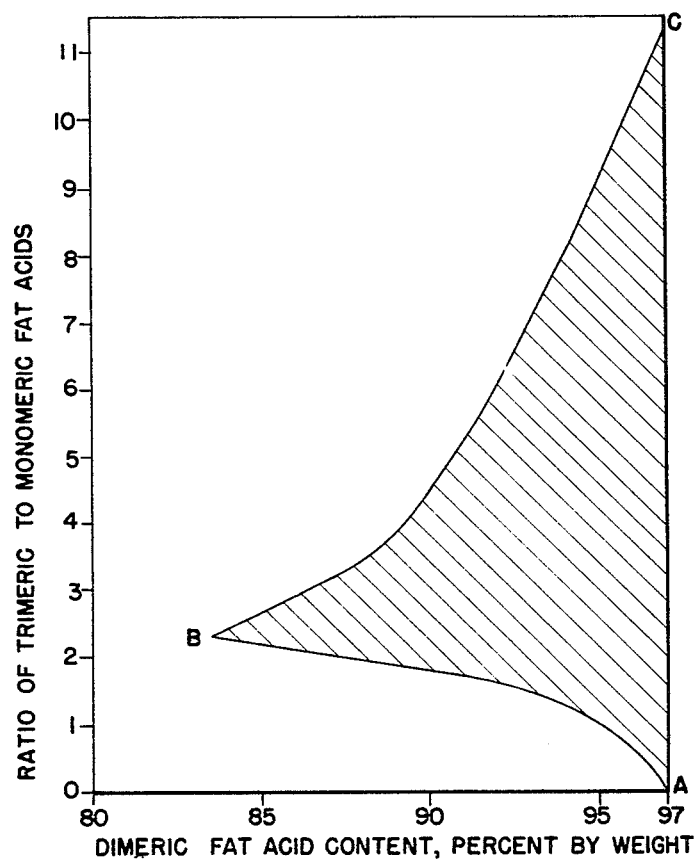

3,396,180
POLYAMIDE RESIN COMPOSITIONS OF ETHYLENE - DIAMINE AND FRACTIONATED POLYMERIC FAT ACIDS
Don E. Floyd, Robbinsdale, and Richard J. Ess and Leonard R. Vertnik, Minneapolis, Minn., assignors to General Mills, Inc., a corporation of Delaware
Filed Jan. 31, 1964, Ser. No. 341,693
2 Claims. (Cl. 260—404.5)

This invention relates to high molecular weight polyamide resins having a particular combination of properties. In particular, it relates to homopolymer polyamide compositions prepared from ethylene diamine and fractionated polymeric fat acids having a specified (1) dimeric fat acid content and (2) trimeric acid to monomeric fat acid ratio.

Polyamide resins of polymeric fat acids are well known. Such polyamide resins, however, present little, if any elongation and possess little toughness. In particular applications, such as, sealants, adhesives, ink resins and thixotropic agents, such polyamides proved unsuitable as lacking the necessary combination of properties. For these applications, polyamides are required having a certain combination of elongation, tensile strength, and heat seal range. In general, such resins are required to have elongations in excess of 50%, a tensile strength in excess of 1000 p.s.i. and a heat seal range of at least 60° C. with a minimum heat sealing temperature of 75° C.

It has now been discovered that this desirable combination of properties can be achieved by the ethylene diamine polyamide of a polymeric fat acid having a particular dimeric fat acid content (D) with a particular trimeric (T) to monomeric (M) fat acid ratio. This is shown in FIG. 1 which is a graphical representation showing the required combination of dimer content and trimer to monomer ratio. In FIG. 1, the products prepared from polymeric fat acid having the combination falling substantially within the shaded areas bounded by curve ABC will provide the required combination of elongation, tensile strength and heat seal range.

It is therefore an object of this invention to prepare the ethylene diamine polyamide resin of a polymeric fat acid having a particular dimeric fat acids content and a particular trimer to monomer ratio.

It is further an object to prepare such a polyamide of polymeric fat acids in which the combinations of dimer content and trimer to monomer ratio fall within the shaded area bounded by curve ABC in FIG. 1.

It is also an object of this invention to prepare a polyamide resin having an elongation in excess of 50%, a tensile strength in excess of 1000 p.s.i., and a heat seal range of at least 60° C. with a minimum heat sealing temperature of 75° C.

Briefly, the polyamide compositions of the present invention are prepared by reacting ethylene diamine with the desired polymeric fat acid. Essentially one molar equivalent of amine is employed per molar equivalent of carboxyl group present. The reaction may be carried out in the range of 150–300° C. at atmospheric pressure for about 1 to 5 hours, during which time the water of condensation is allowed to distill off, and following which a vacuum (ca. 20 mm. Hg) is applied and the product maintained at 150–300° C. for ½ to 3 hours.

The required polymeric fat acid is one having a particular trimer to monomer ratio for each level of dimeric fat acids content. Defining the exact trimer: monomer ratio for each level of dimeric fat acids content by an appropriate mathematical relationship is impractical. For our purposes, we have found that a graphical representation most accurately depicts the bounds of the present invention. Accompanying FIG. 1 is a plot of the area within which satisfactory products may be made using the concept of our invention. The ordinate is a scale of trimer: monomer ratio. The abscissa is a scale of dimeric fat acids content in percent by weight. The area bounded substantially within the curve ABC includes those polyamides, defined in the present invention, which are considered satisfactory adhesives. The area essentially outside the area ABC contains those polyamides which are not satisfactory adhesives. Those products falling generally below the boundary AB fail as being brittle and non-flexible. Those falling generally above the boundary BC fail as having a melt viscosity of a level impractically high or as being intractable gelled polymers. As is apparent from the curve ABC at substantially 84% dimer content, the trimer to monomer ratio is extremely narrow being substantially 2.3. As the dimer content increases, this ratio expands to a widening range. At about 97% dimer acid content, the criticality of the trimer to monomer ratio becomes almost non-existent. As a practical matter, at 97% dimer acid content a general range of the ratio of 0.3 to about 10 may be given.

The term "polymeric fat acids" as used herein is intended to be generic to polymerized acids obtained from "fat acids." The term "fat acids" is intended to include saturated, ethylenically unsaturated and acetylenically unsaturated naturally occurring and synthetic monobasic aliphatic acids containing from 8–24 carbon atoms.

The saturated, ethylenically unsaturated and acetylenically unsaturated fat acids are generally polymerized by somewhat different techniques, but because of the functional similarity of the polymerization products, they all are generally referred to as "polymeric fat acids."

Saturated fat acids are difficult to polymerize but polymerization can be obtained at elevated temperatures with a peroxidic catalyst such as di-t-butyl peroxide. Because of the generally low yields of polymeric products, these materials are not currently commercially significant. Suitable saturated fat acids include branched and straight acids such as caprylic acid, pelargonic acid, capric acid, lauric acid, myristic acid, palmitic acid, isopalmitic acid, stearic acid, arachidic acid, behenic acid and lignoceric acid.

The ethylenically unsaturated acids are much more readily polymerized. Catalytic or non-catalytic polymerization techniques can be employed. The non-catalytic polymerization generally requires a higher temperature. Suitable catalysts for the polymerization include acid or alkaline clays, di-t-butyl peroxide, boron trifluoride and other Lewis acids, anthraquinone, sulfur dioxide and the like. Suitable monomers include the branched straight chain, poly- and monoethylenically unsaturated acids such as 3-octenoic acid, 11-dodecenoic acid, linderic acid, lauroleic acid, myristoleic acid, tsuzuic acid, palmitoleic acid, petroselinic acid, oleic acid, elaidic acid, vaccenic acid, gadoleic acid, cetoleic acid, nervoni acid, linoleic acid, linolenic acid, eleostearic acid, hiragonic acid, moroctic acid, timnodonic acid, eicosatetraenoic acid, nisinic acid, scoliodonic acid and chaulmoogric acid.

The acetylenically unsaturated fat acids can be polymerized by simply heating the acids. Polymerization of these highly reactive materials will occur in the absence of a catalyst. The acetylenically unsaturated acids occur only rarely in nature and are expensive to synthesize. Therefore, they are not currently of commercial signficance. Any acetylenically unsaturated fat acid, both straight chain and branched chain, both mono-unsaturated and polyunsaturated, are useful monomers for the preparation of the polymeric fat acids. Suitable examples of such materials include 10-undecynoic acid, tariric acid, stearolic acid, behenolic acid and isamic acid.

Because of their ready availability and relative ease of polymerization, oleic and linoleic acid are the preferred starting materials for the preparation of the polymeric fat acids.

It is understood that the term "polymeric fat acids" includes the acids and such other derivatives capable of forming amides in a reaction with a diamine such as the lower alcohol esters of polymeric fat acids.

Having obtained the polymeric fat acids or derivatives as described above, they may then be fractionated, for example, by conventional techniques of distillation of solvent extraction. They may be hydrogenated (before or after distillation) to reduce unsaturation under hydrogen pressure in the presence of a hydrogenation catalyst.

Typical compositions of commercially available polymeric fat acids, based on unsaturated $C_{18}$ fat acids, are:

$C_{18}$ monobasic acids ("monomer") 5–15% by weight;
$C_{36}$ dibasic acids ("dimer") 60–80% by weight;
$C_{54}$ (and higher) ("trimer") polybasic acids 10–35% by weight.

The following examples will serve to illustrate further the spirit and scope of the present invention. These examples are not to be construed as limiting, but merely serve as illustrations of compositions falling within the scope of our invention. Percentages and parts are by weight unless specifically noted otherwise.

Example 1

Into a glass reactor equipped with thermometer, stirrer and distillation head was placed the polymeric fat acids from tall oil. After heating to 60° C., a molar equivalent amount of ethylene diamine was added. The heat was gradually raised over a period of 2 hours to 205° C., during which time most of the water of reaction was removed. The temperature was held at 205° C. for two hours. Water pump vacuum was then applied (10 to 20 mm. Hg) and held at 205° C. for an additional 2 hours. The resulting product was then analyzed and tested and the data reported in the attached Table I.

TABLE I

| | Percent M | Percent D | Percent T | T/M | Acid No. | Amine No. | B & R M. Pt. °C. | Visc. 160° C. Poises | Visc. 205° C. Poises | Tensile Strength, P.s.i. | Percent Elong. | Heat Seal* Range, °C. |
|---|---|---|---|---|---|---|---|---|---|---|---|---|
| Run No.: | | | | | | | | | | | | |
| 1A | 3 | 90 | 7 | 2.33 | 4.14 | 6.65 | 103.5 | 185 | 30 | 1,655 | 425 | 75–155 |
| 1B | 3 | 90 | 7 | 2.35 | 5.85 | 2.35 | 110 | 330 | 60 | 2,266 | 440 | 86–155 |
| 2A | 2 | 92 | 6 | 3 | 3.92 | 6.35 | 112.8 | 260 | 52.5 | 2,140 | 460 | 80–160 |
| 2B | 2 | 92 | 6 | 3 | 5.1 | 3.55 | 110 | 450 | 105 | 2,446 | 500 | 90–170 |
| 3 | 2 | 93.6 | 4.2 | 2.1 | 5.1 | 3.85 | 114 | 255 | 40 | 2,151 | 390 | 80–155 |
| 4 | 2.5 | 90.3 | 7.1 | 2.84 | 5.45 | 2.55 | 111.3 | 555 | 80 | 2,161 | 540 | 80–165 |
| 5 | 2.16 | 95.68 | 2.16 | 1 | 5.25 | 2.25 | 112 | 400 |  | 1,050 | 775 | 76–155 |
| 6 | 2.14 | 95.72 | 2.14 | 1 | 6.12 | 4.86 | 109 |  | 30 | 1,926 | 500 | 80–145 |
| 7** | 1.7 | 95.2 | 3.1 | 2 | 1.85 | 2.9 | 114 | (¹) | (²) | 2,632 | 466 | 80–185 |
| 8 | 2.72 | 92.5 | 4.78 | 1.75 | 5.75 | 3.35 | 110 | 142.5 | 25 | 1,960 | 230 | 80–150 |
| 9 | 4.0 | 88 | 8 | 2 | 4.75 | 3.5 | 110 | 550 | 110 | 2,100 | 366 | 75–180 |
| 10 | 3 | 88 | 9 | 3 | 6.45 | 2.05 | 111.25 | 705 | 150 | 1,926 | 417 | 75–175 |

*Test Procedure, "Modern Packaging", page 135, Nov. 1952.   **Prepared at temperature of 225° C.   ¹ 84 at 225° C.   ² 121 at 210° C.

The relative ratios of monomer, dimer and trimer (or higher) in unfractionated polymeric fat acids are dependent on the nature of the starting material and the conditions of polymerization. For the purposes of this invention, the term monomeric fat acids refers to the unpolymerized monomeric acids or derivatives present in the polymeric fat acids; the term dimeric fat acids refers to the dimeric acids or derivatives (formed by the dimerization of two fat acid molecules); and the term trimeric fat acids refers to the residual higher polymeric forms consisting primarily of trimeric acids or derivatives, but containing some higher polymeric forms.

For the purpose of this invention, the terms monomeric (M), dimeric (D) and trimeric (T) fat acids, are defined further by a micromolecular distillation analytical method. The method is that of Paschke, R. F., et al., J. Am. Oil Chem. Soc XXXI (No. 1), 5 (1954), wherein the distillation is carried out under high vacuum (below 5 microns) and the monomeric fraction is calculated from the weight of product distilling at 155° C., the dimeric fraction is calculated from that distilling between 155° C. and 250° C., and the trimeric (or higher) fraction is calculated based on the residue.

Mixtures may be fractionated by suitable means such as high vacuum distillation or solvent extraction techniques so as to obtain dimer acid cuts of greater than 83% by weight. It is these dimer-rich fractions which are the starting materials for the copolyamides of the present invention.

Example II

In a similar manner as Example I polyamides were prepared from ethylene-diamine and polymeric fat acids from tall oil with the following analysis:

Percent M _____ 0.5
Percent D _____ 95.0
Percent T _____ 4.5
D/T _____ 9.0

The data thereon is summarized in the following Table II.

TABLE II

| Eq. Amine Used per Eq. Acid | Acid No. | Amine No. | Ball and Ring M.P., °C. | Visc. at 210° C. Poises | Elong., Percent | Tens. Str., Lbs. | Heat Seal Range, °C. | D° C. |
|---|---|---|---|---|---|---|---|---|
| 1.00 | 1.8 | 3.5 | 123 | 335 | 475 | 3,300 | 85–>225 | >140 |
| .98 | 3.7 | 1.6 | 130 | 807 | 450 | 3,200 | 80–225 | 140 |
| .96 | 6.2 | 0.8 | 110 | 238 | 450 | 2,200 | 80–185 | 105 |
| .94 | 9.0 | 0.7 | 127 | 39 | 475 | 1,700 | 85–160 | 75 |
| .96 | 5.8 | 0.7 | 117 | 132 | 475 | 2,400 | 80–190 | 110 |

The embodiments of the invention in which an exclusive property or privilege is claimed are defined as follows:

1. In an ethylene-diamine polyamide or polymeric fat acids prepared by reacting said diamine and polymeric fat acids at temperatures in the range of 150 to 300° C. employing essentially one molar equivalent of amine per molar equivalent of carboxyl group, said polymeric fat acids being polymerized monocarboxylic aliphatic acids having from 8 to 24 carbon atoms, the improvement comprising employing a polymeric fat acid having a dimeric fat acid content and a ratio of trimeric to monomeric fat acids defined substantially within the area ABC of FIG. 1 as determined by micromolecular distillation.

2. A polyamide as defined in claim 1 wherein said polymeric fat acid is polymerized tall oil fatty acids.

(References on following page)

References Cited

UNITED STATES PATENTS

| | | |
|---|---|---|
| 2,550,682 | 5/1951 | Falkenburg et al. __ 260—404.5 X |
| 2,450,940 | 10/1948 | Cowan et al. _____ 260—404.5 X |
| 2,495,008 | 1/1950 | Keaton. |
| 2,635,974 | 4/1963 | Terry. |

OTHER REFERENCES

"Emery 3079–S Polymerized Fatty Acid," Development Product Bulletin No. 69, October 1956—4 pages.

NICHOLAS S. RIZZO, *Primary Examiner.*

F. A. MIKA, *Assistant Examiner.*

UNITED STATES PATENT OFFICE
CERTIFICATE OF CORRECTION

Patent No. 3,396,180                                               August 6, 1968

Don E. Floyd et al.

It is certified that error appears in the above identified patent and that said Letters Patent are hereby corrected as shown below:

Column 1, line 16, after "trimeric" insert -- fat --. Column 2, line 55, "nervoni" should read -- nervonic --. Columns 3 and 4, TABLE I, twelfth column, line 2 thereof, "440" should read -- 330 --; same table, thirteenth column, line 2 thereof, "86-155" should read -- 85-155 --.

Signed and sealed this 10th day of February 1970.

(SEAL)
Attest:

Edward M. Fletcher, Jr.                               WILLIAM E. SCHUYLER, JR.
Attesting Officer                                                  Commissioner of Patents